United States Patent
Mathis et al.

(10) Patent No.: US 9,400,145 B2
(45) Date of Patent: Jul. 26, 2016

(54) FLEXIBLE MULTI-TUBE CLEANING LANCE POSITIONER GUIDE APPARATUS

(71) Applicant: STONEAGE, INC., Durango, CO (US)

(72) Inventors: Todd Mathis, Durango, CO (US); Damon Martin Gilbert, Aptos, CA (US)

(73) Assignee: STONEAGE, INC., Durango, CO (US)

(*) Notice: Subject to any disclaimer, the term of this patent is extended or adjusted under 35 U.S.C. 154(b) by 0 days.

(21) Appl. No.: 14/808,322

(22) Filed: Jul. 24, 2015

(65) Prior Publication Data

US 2016/0025432 A1    Jan. 28, 2016

Related U.S. Application Data

(60) Provisional application No. 62/028,920, filed on Jul. 25, 2014.

(51) Int. Cl.
| | |
|---|---|
| *A47F 7/14* | (2006.01) |
| *A47G 1/16* | (2006.01) |
| *F28G 3/16* | (2006.01) |
| *F28G 15/04* | (2006.01) |
| *F28G 15/02* | (2006.01) |
| *B08B 3/02* | (2006.01) |

(52) U.S. Cl.
CPC ............... *F28G 3/163* (2013.01); *B08B 3/024* (2013.01); *F28G 15/02* (2013.01); *F28G 15/04* (2013.01)

(58) Field of Classification Search
CPC ......... F28G 3/163; F28G 15/04; F28G 15/02; B08B 3/024
See application file for complete search history.

(56) References Cited

U.S. PATENT DOCUMENTS

| | | | | |
|---|---|---|---|---|
| 4,566,406 A | * | 1/1986 | Appleman | F22B 37/483 122/32 |
| 4,620,881 A | * | 11/1986 | Booij | B08B 3/02 122/382 |
| 4,676,201 A | * | 6/1987 | Lahoda | F22B 37/483 122/382 |
| 4,848,278 A | * | 7/1989 | Theiss | F22B 37/483 122/383 |
| 5,570,660 A | * | 11/1996 | Vandenberg | F28G 1/166 122/379 |
| 5,782,209 A | * | 7/1998 | Vandenberg | F22B 37/483 122/379 |
| 5,813,370 A | * | 9/1998 | Owen | F22B 37/483 122/382 |
| 2016/0096202 A1 | * | 4/2016 | Zink | B08B 3/024 134/179 |

* cited by examiner

*Primary Examiner* — Amy Sterling
(74) *Attorney, Agent, or Firm* — Greenberg Traurig, LLP

(57) ABSTRACT

A guide tube pitch adjustment apparatus for aligning distal ends of lance guide tubes in registry with tube openings in a heat exchanger tube sheet is disclosed. A guide tube pitch clamp assembly carried within and supported from a housing. The pitch clamp assembly has at least two V-blocks fastened to a threaded rod. One V-block is fastened to a portion of the threaded rod having right hand threads, and another V-block is fastened to another portion of the threaded rod having left hand threads. Each of the V-blocks supports a portion of one of the guide tubes, and a cross bar clamp within the housing is oriented to span across the V-blocks and adjustably hold the portions of the guide tubes in a spaced relationship such that spacing between the distal ends of adjacent guide tubes may be adjusted by rotation of the threaded rod.

4 Claims, 5 Drawing Sheets

FLEXIBLE MULTI-TUBE CLEANING LANCE POSITIONER GUIDE APPARATUS

CROSS REFERENCE TO RELATED APPLICATIONS

This application claims the benefit of priority of U.S. Provisional Application Ser. No. 62/028,920 filed Jul. 25, 2014, entitled Flexible Multi-Tube Cleaning Lance Positioner Guide Apparatus, the content of which is incorporated by reference in its entirety.

BACKGROUND OF THE DISCLOSURE

The present disclosure is directed to high pressure fluid rotary nozzle systems. In particular, embodiments of the present disclosure are directed to an apparatus for positioning flexible tube cleaning lances in registry with a heat exchanger tube sheet.

Conventional lance positioner frames are rigid frame structures that can be assembled adjacent a heat exchanger once the tube sheet flange cover has been removed. Such assemblies are heavy, generally awkward to set up and utilize, and most require a substantial amount of space adjacent to or in line with the tube sheet which may limit the feasibility of using such assemblies. A guide tube between the lance drive assembly and the tube sheet minimizes inadvertent spray release from the high pressure nozzle. Additionally, the guide tubes serve to properly position the lance and high pressure nozzle for repeatable insertion into the tube sheet for cleaning.

When it is desired to drive two or more lances at the same time to and from the tube sheet, sets of guide tubes guide the lances and prevent fluid from escaping the tube sheet inadvertently. An adjustable spreader may be fastened between the distal ends of the guide tubes, adjacent the tube sheet, to adjust the spacing of the distal ends of the guide tubes so as to precisely register with the particular tubes in the tube sheet to be cleaned. This adjustable spreader is located adjacent the tube sheet. The spreader can be manually readjusted to match the tube spacing in the tube sheet to accommodate the installation of differently sized guide tubes. What is needed is a device that can adjust guide tubes simply from a position spaced away from the tube sheet.

SUMMARY OF THE DISCLOSURE

The present disclosure directly addresses such needs. One embodiment of a pitch adjustment apparatus for aligning distal ends of lance guide tubes in registry with tube openings in a heat exchanger tube sheet includes an elongated housing, a hose stop bracket fixed within one end of the housing holding each proximal end of a plurality of guide tubes, wherein distal ends of the guide tubes extend out of an opposite end of the housing. A guide tube pitch clamp assembly is carried within and supported from the housing and spaced from the stop bracket. The pitch clamp assembly has at least two V-blocks fastened to a threaded rod. One V-block is fastened to a portion of the threaded rod having right hand threads. Another V-block is fastened to another portion of the threaded rod having left hand threads. A cross bar clamp is oriented in the housing to span across the V-blocks, with each of the V-blocks supporting a portion of one of the guide tubes, whereby spacing between the distal ends of adjacent guide tubes is adjusted by rotation of the threaded rod.

An exemplary embodiment of the present disclosure includes, in a high pressure fluid multiple tube cleaning apparatus having a frame for holding a flexible lance positioning mechanism adjacent to and spaced from a heat exchanger tube sheet, wherein the frame includes an upper guide rail; a lower guide rail, a positioner rail supported from one of the upper and lower guide rails and guided by the other of the upper and lower guide rails, and wherein the lance positioning mechanism is movably supported on the positioner rail, a pitch adjustment apparatus fastened to the positioning mechanism and supporting a plurality of lance guide tubes. This pitch adjustment apparatus has an elongated rectangular tubular housing supporting proximal ends of the plurality of guide tubes therein. A hose stop bracket is fixed within one end of the housing and couplings in the housing hold each of the proximal ends of the plurality of guide tubes.

A guide tube pitch clamp assembly is carried within and supported from the housing and is spaced from the couplings holding the proximal ends of the guide tubes. The pitch clamp assembly has at least two V-blocks fastened to a threaded rod, wherein one V-block is fastened to a portion of the threaded rod having right hand threads, and another V-block is fastened to another portion of the threaded rod having left hand threads. A cross bar clamp is oriented to span across the V-blocks, each of the V-blocks supporting a portion of one of the guide tubes, wherein distal ends of the guide tubes extend from the housing, whereby spacing between the distal ends of adjacent guide tubes is adjusted by rotation of the threaded rod.

An exemplary embodiment of a high pressure fluid multiple tube cleaning apparatus in accordance with the present disclosure includes a frame for holding a flexible lance positioning mechanism adjacent to and spaced from a heat exchanger tube sheet. The frame includes an upper guide rail; a lower guide rail, a positioner rail supported from one of the upper and lower guide rails and guided by the other of the upper and lower guide rails. The lance positioning mechanism is movably supported on the positioner rail. A pitch adjustment apparatus is fastened to the positioning mechanism and supports a plurality of lance guide tubes. This pitch adjustment apparatus includes an elongated rectangular tubular housing supporting proximal ends of the plurality of guide tubes therein, a hose stop bracket fixed within one end of the housing holding each of the proximal ends of the plurality of guide tubes, and a guide tube pitch clamp assembly carried within and supported from the housing and spaced from the stop bracket. The pitch clamp assembly has at least two tube support blocks fastened side by side in the housing to a threaded rod. One tube support block is fastened to a portion of the threaded rod having right hand threads and another tube support block is fastened to another portion of the threaded rod having left hand threads. A cross bar clamp is oriented to span across the tube support blocks. Each of the tube support blocks support a portion of one of the guide tubes. Distal ends of the guide tubes extend from the housing. Spacing between the distal ends of adjacent guide tubes outside the housing is adjusted by rotation of the threaded rod within the housing when the cross bar clamp is released from pressing the guide tubes against the support blocks.

Further features, advantages and characteristics of the embodiments of this disclosure will be apparent from reading the following detailed description when taken in conjunction with the drawing figures.

DETAILED DESCRIPTION

Figure 1:
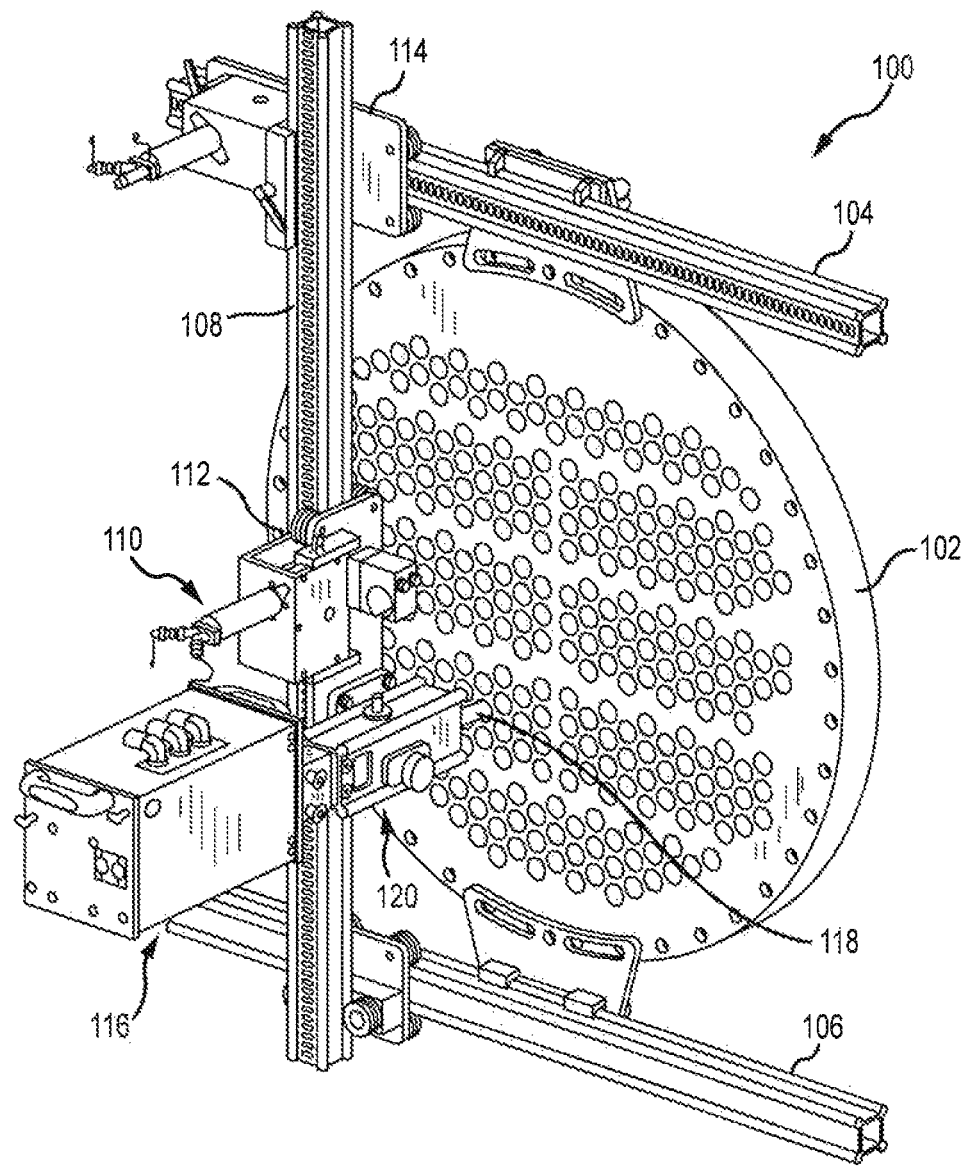
FIG. 1 is a perspective view of an exemplary embodiment of a flexible lance positioner drive apparatus in accordance with the present disclosure oriented against and fastened to an exemplary heat exchanger tube sheet.

An exemplary frame apparatus 100 in accordance with the present disclosure is shown in FIG. 1 fastened to a heat exchanger tube sheet 102. The apparatus 100 has an upper generally horizontal guide rail 104, a lower guide rail 106 oriented parallel to the upper guide rail 104, and a positioner support rail 108 that supports a flexible lance positioner drive assembly 110. This drive assembly 110 includes an air motor driven positioner trolley 112 that can be remotely driven along the support rail 108. Similarly, an air motor driven trolley 114 is mounted on the upper guide rail 104.

The flexible lance positioner assembly 110 includes a flexible lance hose drive 116, a set of guide tubes 118, and a guide tube pitch adjust apparatus 120 in accordance with the present disclosure mating the drive 116 to the guide tubes 118. The guide tube pitch adjust apparatus 120 is fastened to the trolley 112 and supports the drive 116 and the guide tubes 118. The pitch adjust apparatus 120 permits precise adjustment of the separation between guide tubes 118 in registry with the tube openings in the tube sheet 102 from the positioner assembly 110 rather than from a position closely adjacent the tube sheet 102.

The pitch adjustment apparatus 120 is structurally robust and facilitates attachment of the drive 116 to the flexible lance positioner assembly 110. This allows an operator to install the frame apparatus 100 and the pitch adjustment apparatus 120 to a tube sheet 102 such that the permissible horizontal and vertical travel of the flexible lance positioner assembly is aligned with the array of tubes in the tube sheet 102 and the guide tube spacing is set to match the pitch of the tube sheet 102. Once the frame apparatus 100 and pitch adjustment apparatus 120 are installed, an operator can either directly attach the drive 116 to the assembly or remotely locate the drive 116 on the ground or other location and install a flexible snout (not shown) between the drive 116 and the pitch adjustment apparatus 120. This interchangeability permits operators to accommodate space constraints, safety considerations or changing application requirements without needing to alter the installed and registered frame 100 and pitch adjustment apparatus 120.

Figure 2:
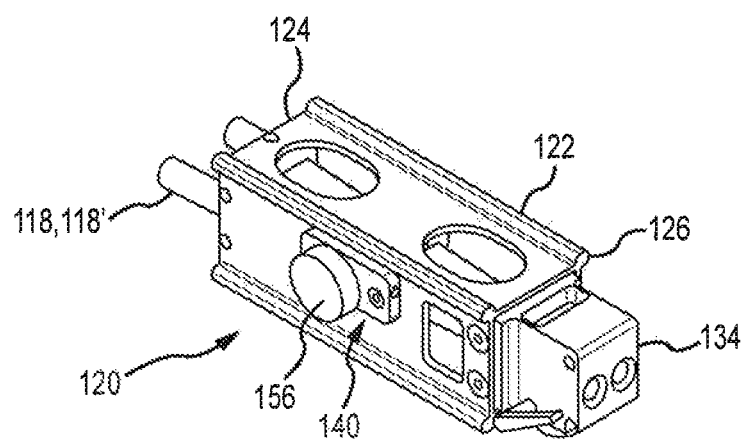
FIG. 2 is a separate perspective view of a hose guide assembly shown in FIG. 1 in accordance with the present disclosure.
Figure 3:
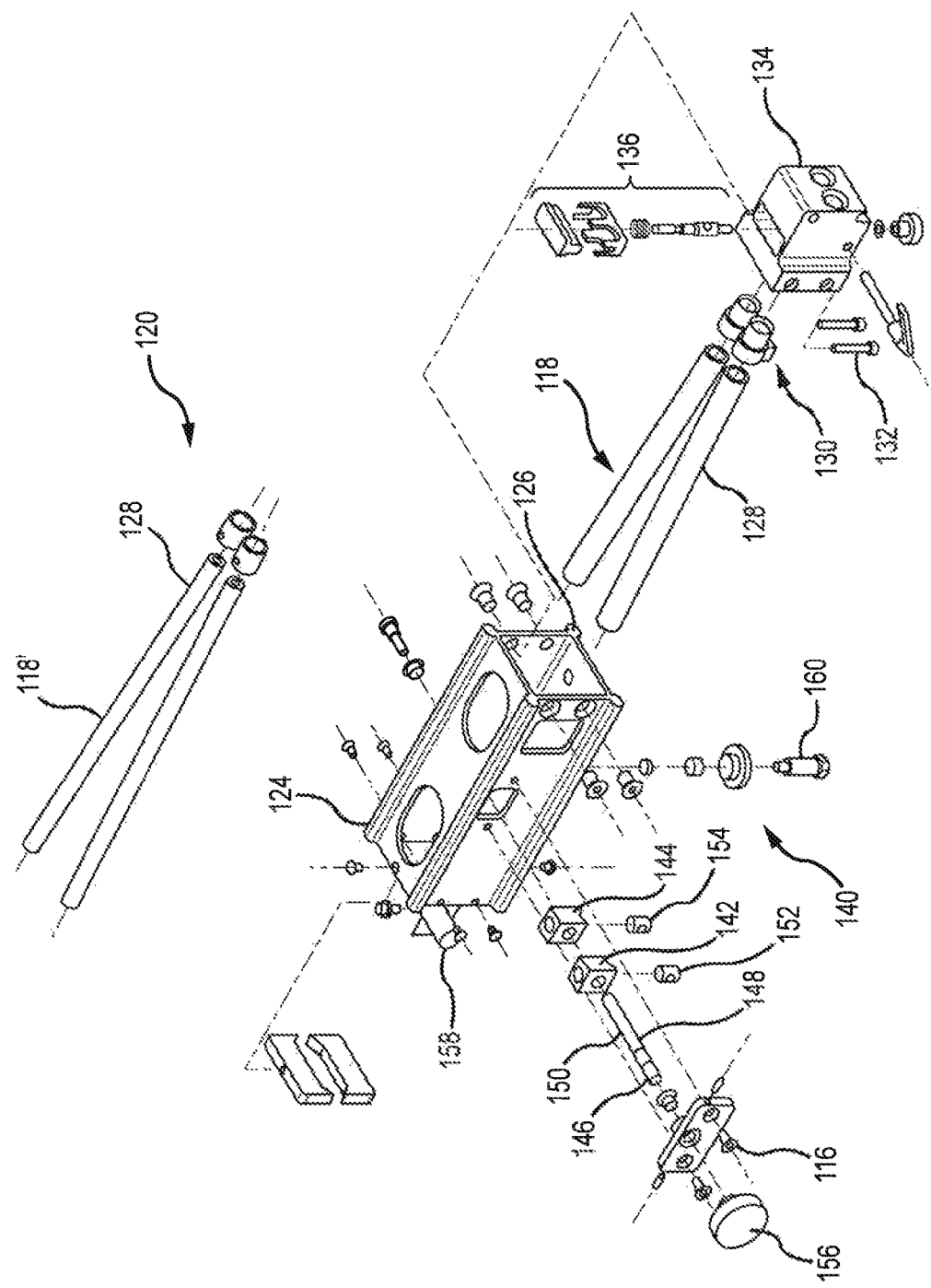
FIG. 3 is an exploded view of the hose guide assembly shown in FIG. 2.
Figure 6:
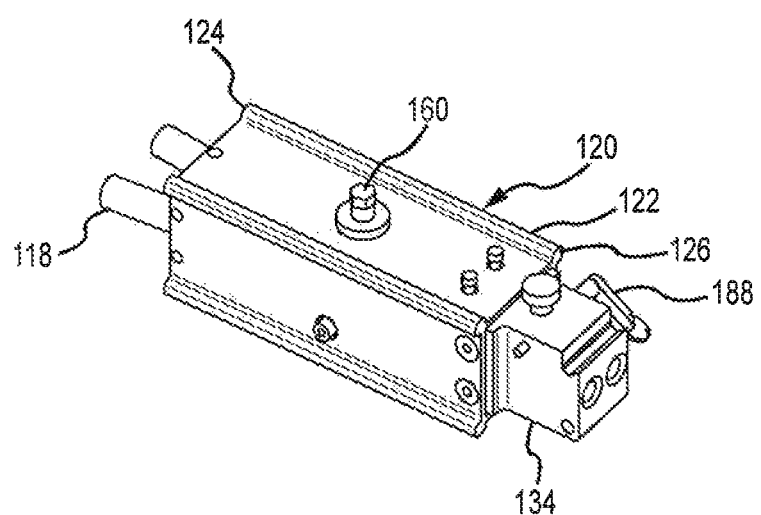
FIG. 6 is an inverted perspective view of the hose guide device shown in FIG. 2.

Turning now to FIGS. 2, 3 and 6, FIG. 2 shows a side perspective view of the guide tube pitch adjustment apparatus 120. FIG. 6 shows an inverted perspective view of this same apparatus 120. FIG. 3 is an exploded view of the guide tube pitch adjustment apparatus 120 separate from the positioner frame trolley 112 showing the internal structures of the apparatus 120.

The pitch adjustment apparatus 120 has a generally rectangular elongated tubular housing 122 having a distal end 124 and a proximal end 126. Housing 122 is preferably a square tubular aluminum extrusion with raised corner ribs for fastening the housing 122 to the trolley 112. This housing 122 supports proximal ends 128 of the guide tubes 118 and/or 118' (smaller diameter). Each of the proximal ends 128 of tubes 118 is fastened to the proximal end of the housing 122 by a coupling sleeve 130 that is screwed to the inside of the proximal end of the housing 122 via screws 132 that pass through the housing 122, and the coupling sleeve 130, and engage the proximal ends 128 of the tubes 118. This means of fastening the proximal ends 128 of the guide tubes 118 permits them to pivot from side to side within the housing 122 while laterally holding the tubes 118 in place within the housing 122.

The housing 122 has a lance hose stop bracket 134 also bolted to the proximal end 126 of the housing 122. This hose stop bracket 134 contains a hose safety stop assembly 136 therein that aligns with the coupling sleeves 130 fastened in the housing 122. The hose safety stop assembly 136, shown in an exploded view in FIG. 3, is separately shown in a perspective view in FIG. 4.

Figure 4:
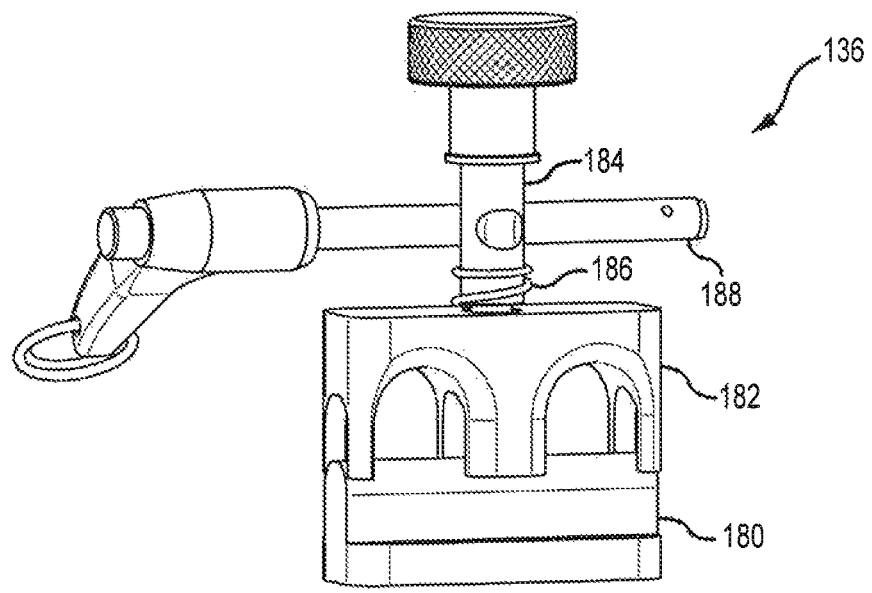
FIG. 4 is a separate perspective view of a hose stop assembly shown in FIG. 3.

This hose safety stop assembly 136, designed for two flexible lance hoses, shown in FIG. 4, has a base jaw block 180 and an adjustable clamp jaw 182 resiliently biased on a hose stop screw 184 via a spring 186. A quick release pin 188 is used to lock the stop assembly in the position shown in FIG. 4 when one or two lances are inserted through the stop assembly 136. The assembly 136 is designed to prevent the flexible lance hose from inadvertently backing completely out of the assembly 120 in the unlikely event of a failure of the nozzle (not shown) during cleaning lance operation.

The hose stop bracket 134 and hose stop safety assembly 136 provide an adjustable hose stop safety feature. This or a similar safety feature is required by many contractors and/or plant operators to address failures of the high pressure lance hose or the high pressure nozzle used for cleaning that is attached to the end of the hose. Without the stop assembly 136, if a failure were to occur, inertial forces on the hose could cause it to thrust rearward and out of the tube being cleaned. Therefore a mechanical stop that can interfere with the hose crimp or an installed safety sleeve on the hose, and catch the hose as it is propelled rearward, is required. This hose safety stop assembly 136 is adjustable and accommodates a range of hose sizes without the need for any part replacement or tools. The adjustable upper clamp jaw 182 and lower base jaw block 180 are also long lasting as compared to other safety solutions such as collets or horseshoe shaped inserts as the adjustment and stopping capability of the present configuration is tolerant of wear on the jaws.

Figure 5:
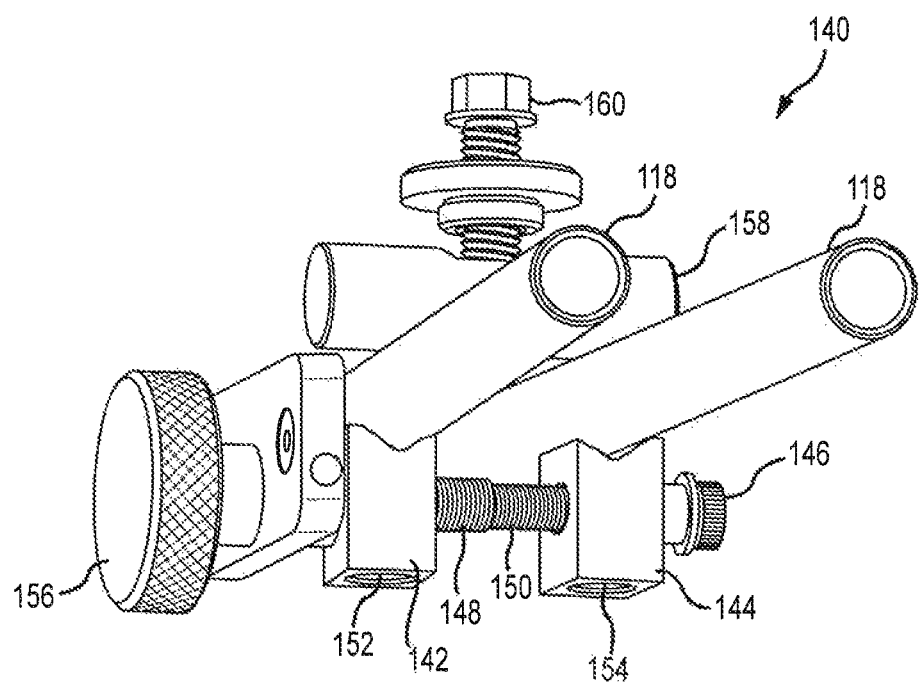
FIG. 5 is a separate perspective view of the guide tube adjustment mechanism internally carried in the assembly shown in FIG. 2.

Housed within and supported by the housing 122 is a guide tube pitch clamp assembly 140 shown separately in FIG. 5. This guide tube clamp assembly 140 is spaced axially from the stop bracket 134 and the proximal end 126 of the housing 122. This clamp assembly 140 includes a plurality, in this case a pair, of V-block shaped tube support blocks 142 and 144 fastened to a threaded shaft 146. This threaded shaft 146 has a right hand threaded portion 148 and a left hand threaded portion 150. A right hand threaded barrel nut 152 is installed within the tube support block 142. A left hand threaded barrel nut 154 is installed within the tube support block 144. These barrel nuts 152 and 154 fasten the tube support blocks 142 and 144 to the threaded portions 148 and 150 respectively of the threaded shaft 146. The threaded shaft 146 is journaled through the sides of the housing 122 and a knurled knob 156 is fixed to one end of the shaft 146. Rotation of the threaded shaft 146 in one direction causes the V-blocks 142 and 144 to move laterally on the shaft 146 closer together. Rotation of the shaft 146 in an opposite direction causes the V-block tube support blocks 142 and 144 to move farther apart.

A cross bar clamp 158 is oriented so as to span over both of the tube support blocks 142 and 144 within the housing 122. The cross bar clamp 158 is fastened in the housing 122 by a bolt 160 threaded through a bore in a central portion of the housing 122 such that clockwise rotation of the bolt 160 pushes the clamp 158 further into the housing 122. When a pair of guide tubes 118 are installed in the housing 122 with their proximal ends 128 within the coupling sleeves 130, and the bolt 160 released, the knob 156 can be rotated to widen or narrow the gap between the distal ends of the guide tubes 118 or 118'. The bolt 160 is then tightened to push the clamp 158 against the tubes 118 in the tube support blocks 142 and 144 to hold the guide tubes in position.

Many changes may be made to the device, which will become apparent to a reader of this disclosure.

For example, the guide tube pitch adjustment apparatus 120 and housing can be duplicated or multiplied to accommodate additional lances (3, 4, etc.). In the case of an apparatus 120 for adjusting three lance tubes, three V blocks would be utilized with the center V block remaining centrally located on a portion of the threaded shaft 146 between the right hand and left hand threaded portions described above. In such a case, turning the shaft 146 clockwise could move the outer V blocks closer to the center V block while counter-clockwise rotation would separate the outer V blocks thus expanding the pitch between the tubes. Similarly, the apparatus can be modified to facilitate attachment of two or more funnel shaped snouts (not shown), to accommodate remote location of two or more drives 116. This type of modification would provide scalable productivity based on the particular job requirements. All such changes, alternatives and equivalents in accordance with the features and benefits described herein, are within the scope of the present disclosure. Such changes and alternatives may be introduced without departing from the spirit and broad scope of my invention as defined by the claims below and their equivalents.

What is claimed is:

1. A guide tube pitch adjustment apparatus for aligning distal ends of lance guide tubes in registry with tube openings in a heat exchanger tube sheet, the apparatus comprising:
   an elongated housing;
   a hose stop bracket fixed within one end of the housing holding each proximal end of a plurality of guide tubes, wherein distal ends of the guide tubes extend out of an opposite end of the housing; and
   a guide tube pitch clamp assembly carried within and supported from the housing and spaced from the stop bracket, wherein the pitch clamp assembly has at least two V-blocks fastened to a threaded rod, wherein one V-block is fastened to a portion of the threaded rod having right hand threads, and another V-block is fastened to another portion of the threaded rod having left hand threads, each of the V-blocks supporting a portion of one of the guide tubes, and a cross bar clamp within the housing oriented to span across the V-blocks and adjustably hold the portions of the guide tubes in a spaced relationship such that spacing between the distal ends of adjacent guide tubes may be adjusted by rotation of the threaded rod.

2. The apparatus according to claim 1 further comprising an adjustable hose safety stop assembly adjacent the hose stop bracket.

3. The apparatus according to claim 2 wherein the hose safety stop assembly comprises an adjustable upper clamp jaw having a plurality of U shaped openings each sized to accommodate a high pressure lance hose passing through the apparatus, a fixed lower base jaw block fastened to the housing, and a spring loaded clamp pin biasing the clamp jaw against the jaw block.

4. The apparatus according to claim 2 wherein the cross bar clamp engages a bolt threaded through a top wall of the housing.

* * * * *